Nov. 6, 1956     H. A. BERNREUTER ET AL     2,769,340
ROOM TEMPERATURE COMPENSATING CIRCUITS FOR PYROMETERS
Filed April 12, 1954
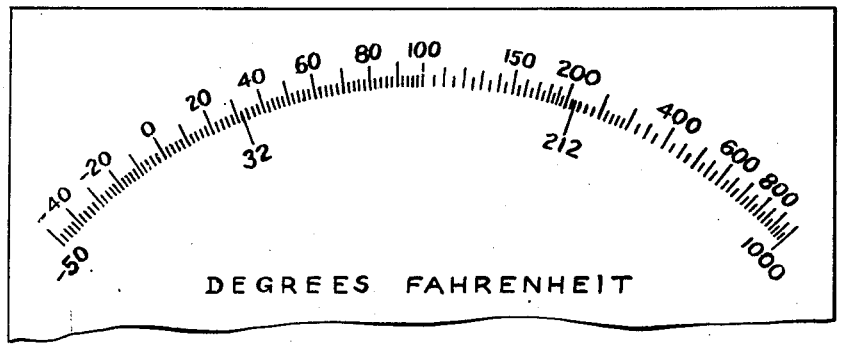
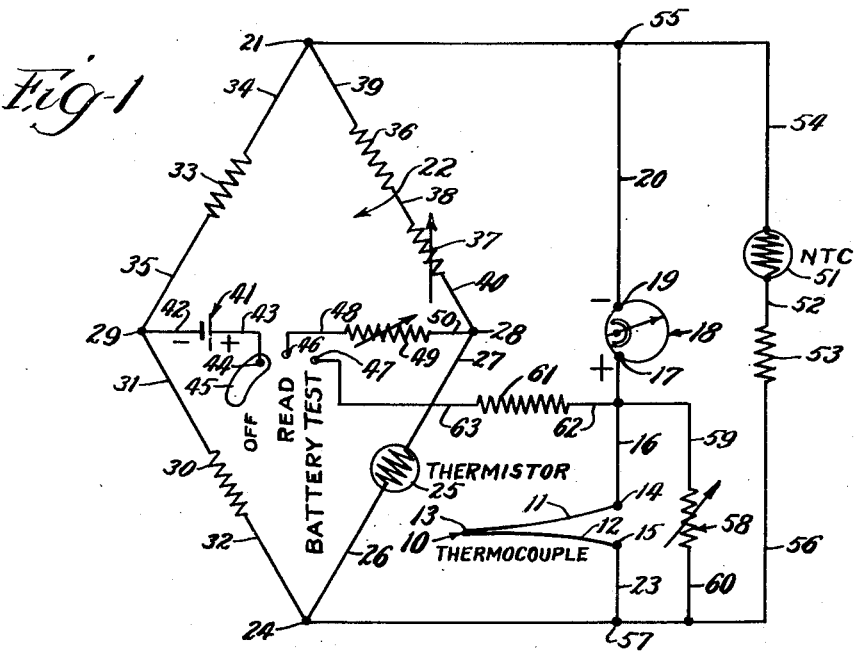
INVENTORS.
Herbert A. Bernreuter &
Leonard E. Carlson
By Robert H. Tendt
Atty.

United States Patent Office 2,769,340
Patented Nov. 6, 1956

2,769,340

ROOM TEMPERATURE COMPENSATING CIRCUITS FOR PYROMETERS

Herbert A. Bernreuter, Elmwood Park, and Leonard E. Carlson, Chicago, Ill., assignors to American Gage & Machine Company, Chicago, Ill., a corporation of Illinois Application April 12, 1954, Serial No. 422,388

3 Claims. (Cl. 73—361)

The present invention relates to room temperature compensating circuits for pyrometers, and is particularly concerned with the compensation for changes in room temperature in pyrometer circuits of the thermocouple type, where the cold end is at room temperature. The reading on a pyrometer of the thermocouple type depends upon the electromotive force generated by the thermocouple; and this in turn depends upon the difference in temperature between the cold junction and the hot junction.

For rough measurements, it may be assumed that the temperature of the cold junction is substantially constant; or if the pyrometer is constantly used with its cold junction disposed in a place where its temperature is constant, the factor of variation of temperature of the cold junction may be disregarded.

However, pyrometers are used in places where the temperature of the cold junction may vary considerably; and the temperature of the cold junction may also be influenced by conduction of heat to it or by radiation of heat to it from nearby articles, which may raise its temperature; and in some cases it may be used with its cold junction at a lower temperature than that used for calibration of the instrument.

One of the objects of the invention is the provision of an improved electrical circuit which is adapted to compensate for meter reading variations which are caused by changes in the temperature of the cold junction that are due to room temperature change or for other reasons.

Another object of the invention is the provision of an improved compensating circuit for pyrometers for correcting meter reading variations that are caused by changes of temperature of the cold end of the thermocouple which are due to temperature changes.

Another object of the invention is the provision of a compensating circuit for cold end temperature changes in pyrometers which is simple, dependable, capable of economical manufacture, and substantially constant in its operation so that the calibration of the meter may be maintained and the accuracy of the instrument increased.

Another object of the invention is the provision of a room temperature compensating circuit for pyrometers which is adapted to be used with a nonlinear or expanded type of meter scale so as to eliminate the errors or lower accuracy which would be caused by the use of a compensator, the change of which is mechanically linear.

Other objects and advantages of the invention will be apparent from the following description and the accompanying drawings, in which similar characters of reference indicate similar parts throughout the several views.

Referring to the single sheet of drawings accompanying this specification,

Fig. 1 is a wiring diagram showing one embodiment of the pyrometer compensating circuit;

Fig. 2 is a plan view of the dial plate showing the expanded type of meter scale which it is advantageous to use with the present compensating circuit.

Referring to Fig. 1, 10 indicates in its entirety the thermocouple forming the E. M. F. generating element of a thermocouple pyrometer, and comprising two dissimilar electrical conductors 11, 12 joined together electrically at their hot juncture 13 and also connected electrically by the circuits which are connected to the cold ends 14, 15 of the thermocouple.

Various types of thermocouple may be employed; but, as one example of the invention, a themocouple comprising an iron element and a constantan element are employed in the present circuit. The resistance of the thermocouple will depend upon its length, material, and cross-sectional size of its elements; and the resistances of the other elements of the circuit are properly proportioned to that of the thermocouple.

In the present example the thermocouple has a resistance of 2.9 ohms. The terminal 14 of the thermocouple is connected by means of a conductor 16, which may be copper, to one terminal 17 of an electric meter 18 of the moving coil type. The other terminal 19 of the meter is connected by conductor 20 to one of the junctions 21 of a bridge circuit, indicated in its entirety by the numeral 22.

The terminal 15 of the thermocouple is connected by conductor 23 to the opposite junction 24 of the bridge circuit 22. The most important part of the bridge circuit 22 may be said to be the thermistor 25, which is a temperature sensitive resistor, the resistance of which varies with temperature because the thermistor has a negative temperature coefficient of resistance; that is, its electrical resistance diminishes as its temperature increases.

The thermistor 25 is maintained at room temperature, which is substantially the same as the temperature of the cold junction 14, 15. The thermistor 25 is connected by conductors 26, 27 between the junctions 24 and 28 of the bridge. The opposite junction of the bridge is indicated at 29.

The bridge includes a resistance 30, which may be of substantially constant value, connected by conductors 31 and 32 between the junctions 24 and 29. It also includes the fixed resistor 33 connected between junctions 21 and 29 by conductors 34 and 35.

The resistance of the resistors 30 and 33 may in each case be 510 ohms, which is maintained constant plus or minus one percent in the present example of the invention. The bridge also includes a fixed resistance 36 and a variable resistance 37, both of which are connected in series by conductor 38 and connected in the bridge circuit by conductors 39 and 40, which connect to the junctions 21 and 28.

The resistance 36 may be 620 ohms plus or minus five percent, in the present example; and the value of the variable resistance may be 400 ohms. The resistance of the thermistor at 80 degrees F. may be within the range of 930 to 970 ohms in the present example.

The bridge circuit includes a battery or standard cell 41, having its negative terminal connected by conductor 42 to junction 29, and having its positive terminal connected by conductor 43 to one of the fixed contacts 44 of an electric switch. The electric switch includes an arcuate bridging contact 45 and two other fixed contacts 46 and 47 and is for the purpose of permitting a battery test, utilizing the same meter as is used for the reading of temperatures and also for cutting the battery out of circuit when the instrument is not in use.

In some embodiments of the invention the battery test switch may be omitted.

The fixed contact 46, which may be labeled "Read," is connected by conductor 48 to a variable resistance 49, which is also connected by conductor 50 to junction 28.

The resistor 37 is a variable resistor used to calibrate the bridge circuit to some predetermined temperature for zero milli-volt output to correspond to the meter at its zero milli-volt output. The variable resistance 49 is used to calibrate the compensating circuit. The battery is used to supply only the current which is needed for the compensating circuit. The thermocouple generates an EMF which produces the main component of current due to the difference in milli-volts between the cold and hot junctions of the thermocouple.

The circuit also preferably includes a temperature sensitive resistor 51, which is connected by conductor 52 to a fixed resistance 53. These two resistances are connected by conductor 54 to the conductor 20 at 55 and by conductor 56 to the conductor 23 at 57. The purpose of the resistance 53 is to adjust the total resistance of the meter circuit to balance the output of the bridge circuit to cause the reading on the meter to be substantially linear.

The purpose of the temperature sensitive resistance 51, which has a negative coefficient of change of resistance with temperature, is to compensate for changes in the resistance of the moving coil of the instrument 18 which are due to changes of the temperature where the moving coil is located, that is, room temperature.

For example, the temperature sensitive resistance 51 may have its temperature vary with resistance according to the following scale:

|       | ohms |
|-------|------|
| 100° F | 2.37 |
| 90° F  | 2.55 |
| 80° F  | 2.75 |
| 70° F  | 3.0  |
| 60° F  | 3.24 |

Another variable resistance 58 is preferably connected to the conductor 16 by a conductor 59 and to the conductor 56 by a conductor 60 so that it is bridged across the open terminals 14, 15 of the cold junction.

The purpose of the resistance 58 is a calibrating resistor to adjust the milli-volt output of the thermocouple to correct temperature reading.

The circuit preferably includes a fixed resistance 61, which is connected by conductor 62 to conductor 16 and conductor 63 to the fixed contact 47. The resistance 61 is used in connection with the battery 41, when connected by means of the arcuate switch arm 45, to test the EMF produced by the battery so that the meter pointer may be adjusted to a zero position before reading temperature.

The operation of the compensating circuit is as follows: The thermocouple 10 produces its own E. M. F., which is due to the difference in temperature between its hot and cold junctions. The hot junction is disposed in contact with or in proximity to the subject the temperature of which is to be measured. The cold junction and meter and compensating circuit are at substantially room temperature; and the purpose of the compensating circuit is to eliminate the errors which are caused by changes in room temperature.

The E. M. F. of the thermocouple is impressed upon the meter 18, which may be calibrated to read correctly at a certain degree temperature; but as the temperature of the room increases, and the cold junction is increased in temperature, the E. M. F. of the thermocouple diminishes, and the reading of the meter diminishes. This is counteracted by the additional E. M. F. that is impressed on the meter by means of the battery 41 acting through the bridge circuit and varied in amount by the variation in resistance of the temperature sensitive resistor 25, which may be of the type called a "thermistor"; and the reading of the meter is corrected.

The reading of the meter may also vary due to the variation in resistance of its movement coil, which may change in temperature; and this is compensated by means of the temperature sensitive resistance 51, which passes more or less of the current due to the E. M. F. impressed upon the meter, depending on the room temperature.

It is one of the advantages of the present compensating circuit that the meter may be provided with a nonlinear or expanded type of meter scale, whereas other types of correctors would cause reading errors due to their change being mechanically linear.

Fig. 2 is an illustration of one type of temperature scale of the expanded nonlinear type, with which the meter 18 may be provided. This provides for a range of temperatures from a minus 50 through zero up to 1,000 degrees F.

It will thus be observed that we have invented an improved circuit for compensating for changes of temperature of the cold end of a thermocouple used as a pyrometer where changes may be due to changes in room temperature.

Our circuit and instrument indicates temperatures with a high degree of accuracy and maintains its calibration for a long period of time; and when used with an expanded, nonlinear scale, gives temperature indications with a greater degree of accuracy for the smaller numbers and with a sufficient degree of accuracy for the higher temperatures, which need not be determined so accurately.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a pyrometer, the combination of a thermocouple with a circuit having four resistances in series with each other forming a bridge having two pairs of opposite terminals, said thermocouple being connected to the first pair of opposite terminals, an energizing circuit including a standard cell and a variable resistor connected in series to the second pair of terminals, one of said resistances being subject to room temperature and having a negative temperature resistance coefficient to compensate for changes in the cold junction temperature, the other three resistances being constant, a meter having meter coils connected in series with said thermocouple across the first pair of terminals of said bridge, said latter terminals being shunted by a variable resistance and so connected that the polarity of the bridge output E. M. F. opposes that of the thermocouple, said variable resistance having a negative temperature coefficient adapted to compensate for variations in the resistance of the meter coils with changes in room temperature.

2. In a pyrometer, the combination of a thermocouple with a circuit having four resistances in series wtih each other forming a bridge having two pairs of opposite terminals, said thermocouple being connected to the first pair of opposite terminals, an energizing circuit including a standard cell and a variable resistor connected in series to the second pair of terminals, one of said resistances being subject to room temperature and having a negative temperature resistance coefficient to compensate for changes in the cold junction temperature, the other three resistances being constant, a meter having meter coils connected in series with said thermocouple across the first pair of terminals of said bridge, said latter terminals being shunted by a variable resistance and so connected that the polarity of the bridge output E. M. F. opposes that of the thermocouple, said variable resistance having a negative temperature coefficient adapted to compensate for variations in the resistance of the meter coils with changes in room temperature, and an adjustable resistance bridged across the thermocouple terminals for adjusting the millivolt output to correct temperature reading.

3. In a pyrometer, the combination of a thermocouple with a circuit having four resistances in series with each other forming a bridge having two pairs of opposite terminals, said thermocouple being connected to the first pair of opposite terminals, an energizing circuit including a standard cell and a variable resistor connected in series to the second pair of terminals, one of said resistances being subject to room temperature and having a negative temperature resistance coefficient to compensate for changes in the cold junction temperature, the other three resistances being constant, a meter having meter coils connected in series with said thermocouple across the first pair of terminals of said bridge, said latter terminals being shunted by a variable resistance and so connected that the polarity of the bridge output E. M. F. opposes that of the thermocouple, said variable resistance having a negative temperature coefficient adapted to compensate for variations in the resistance of the meter coils with changes in room temperature, and an adjustable resistance bridged across the thermocouple terminals for adjusting the millivolt output to correct temperature reading, switch means in the battery circuit and having a movable switch arm and a further fixed resistance connected at one end to one of the terminals of said meter and arranged to be connected by said movable switch arm to the standard cell and adapted to be used to adjust the pointer of said meter to zero position before reading temperature.

References Cited in the file of this patent

UNITED STATES PATENTS

| | | |
|---|---|---|
| 1,695,867 | Stickney | Dec. 18, 1928 |
| 1,982,053 | Hodgson | Nov. 27, 1934 |
| 2,230,779 | Johnson | Feb. 4, 1941 |